W. C. STEVENS.
FABRIC HANDLING TRUCK.
APPLICATION FILED DEC. 4, 1917.
1,263,293.
Patented Apr. 16, 1918.
3 SHEETS—SHEET 1.
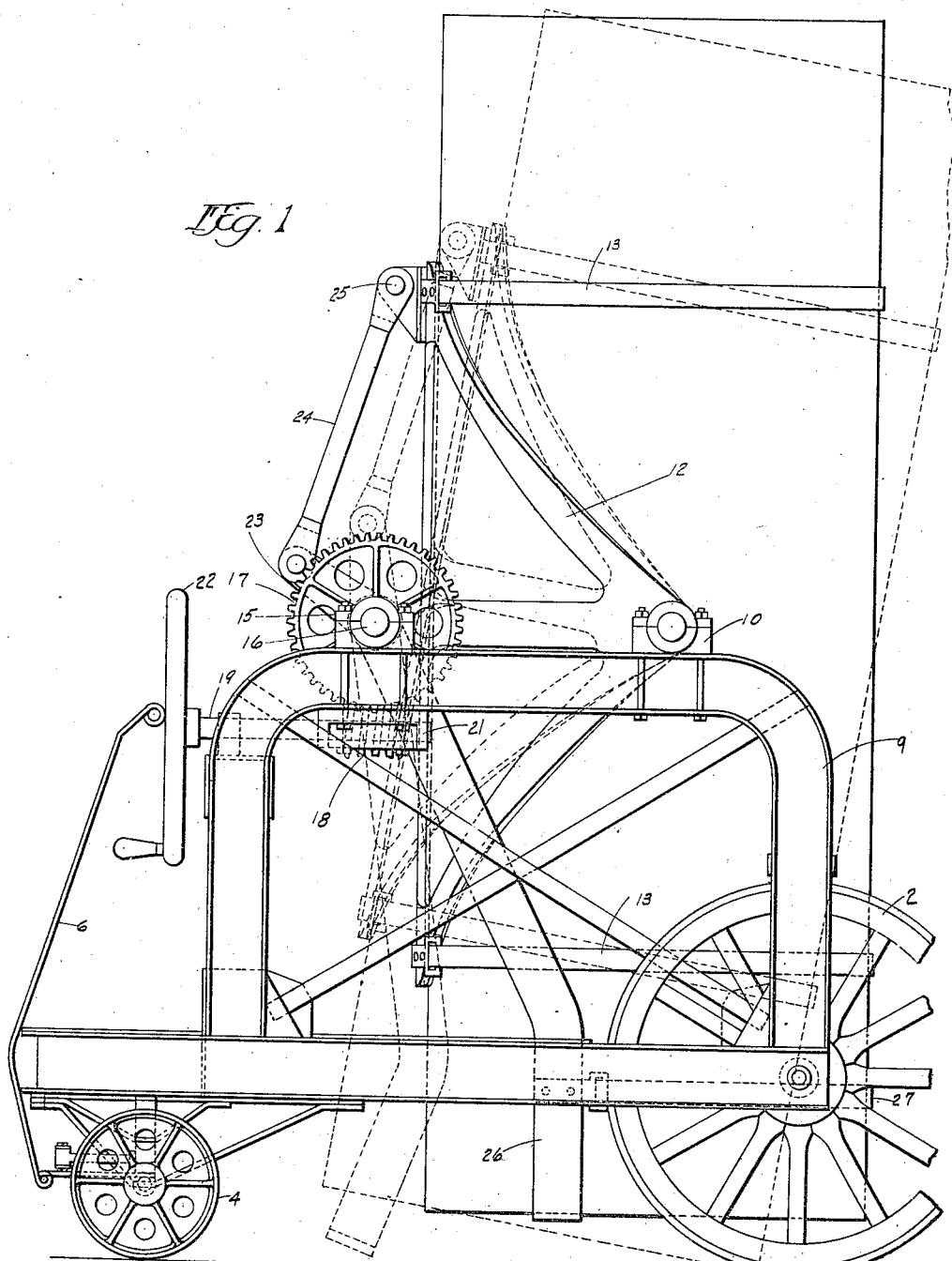

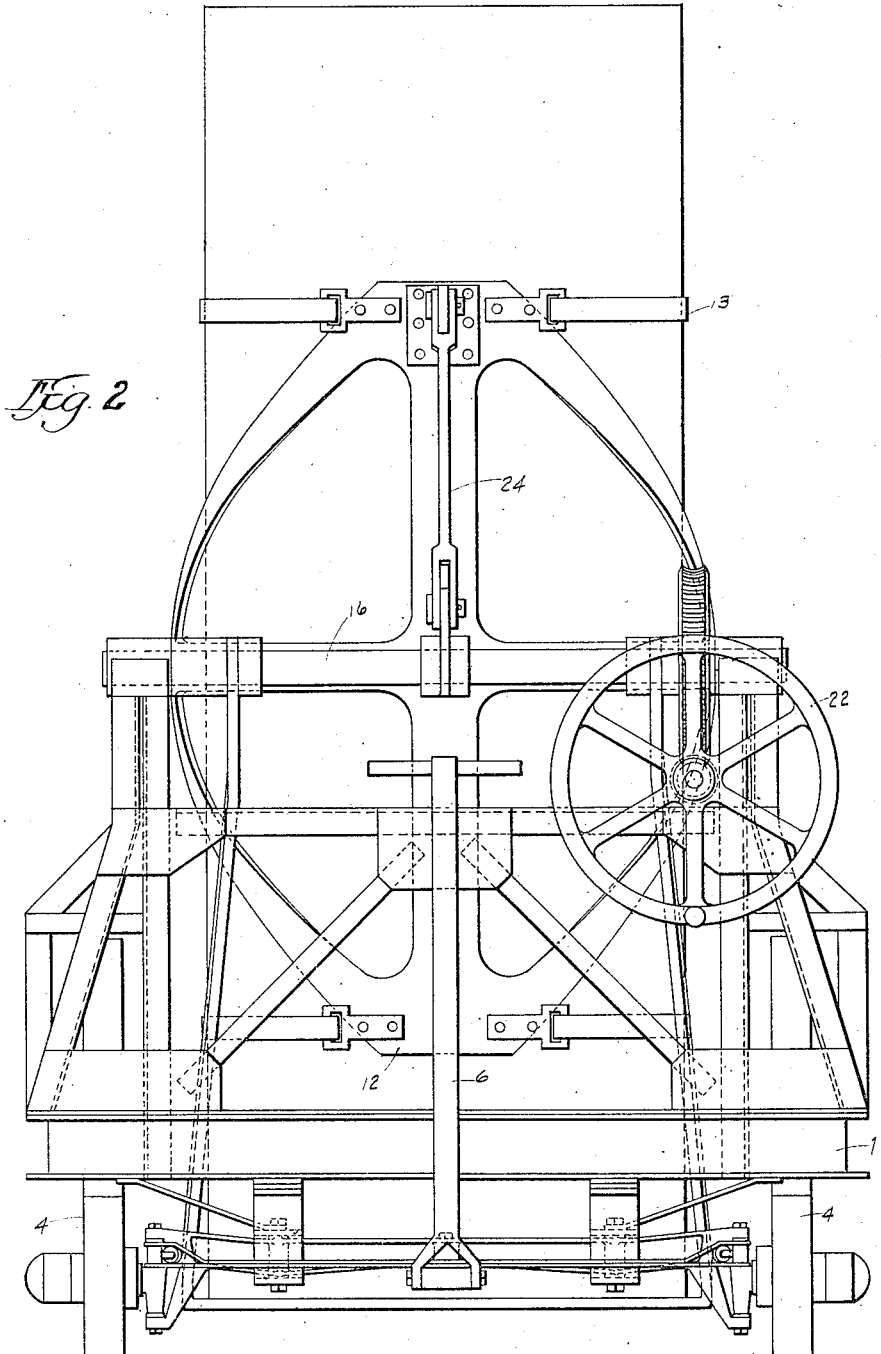

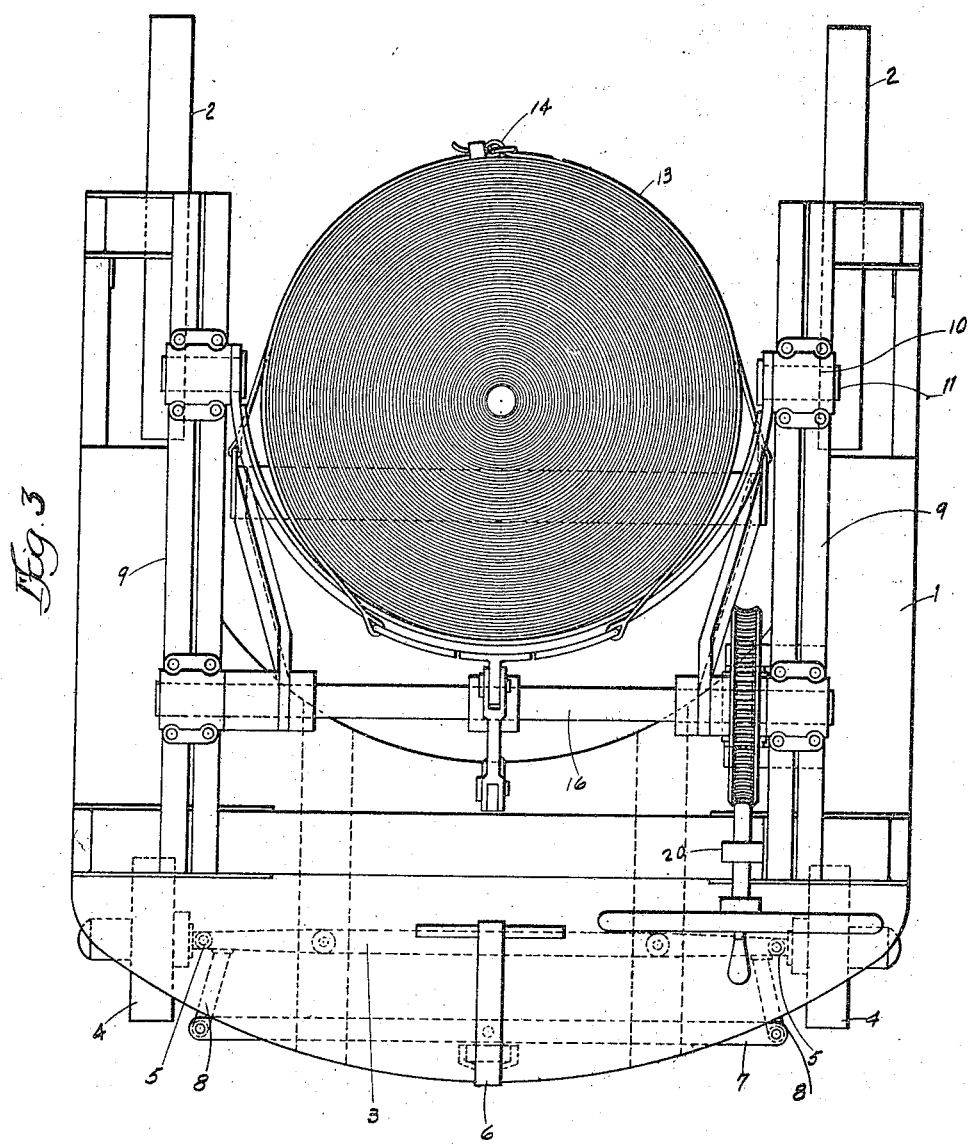

UNITED STATES PATENT OFFICE.

WILLIAM C. STEVENS, OF SUMMIT COUNTY, OHIO, ASSIGNOR TO THE FIRESTONE TIRE & RUBBER COMPANY, OF AKRON, OHIO, A CORPORATION OF OHIO.

FABRIC-HANDLING TRUCK.

1,263,293.   Specification of Letters Patent.   Patented Apr. 16, 1918.

Application filed December 4, 1917. Serial No. 205,441.

*To all whom it may concern:*

Be it known that I, WILLIAM C. STEVENS, residing in the county of Summit and State of Ohio, have invented certain new and useful Improvements in Fabric-Handling Trucks, of which the following is a specification.

In rubber factories it is customary to handle large rolls of fabric which often run as high as eighty-four (84") inches wide, and sometimes there is five hundred (500) yards to the roll. These rolls are very heavy and hard to handle and it has been the purpose of this invention to design a truck which will enable a single operator to handle them easily and quickly in moving them from place to place about the factory and bringing them to the machines in which the fabric is to be treated, such as calenders, bias cutters or the like.

A further purpose of my invention has been to construct a light truck which will be adequate for the purpose intended without occupying too much space in the factory. As these trucks are often required to be operated by unskilled operators it is necessary that they should be extremely simple in every respect.

Although the primary design of this invention is for handling rolls of fabric in tire factories it is not limited to this use but may be utilized for handling other heavy articles.

These and other objects will appear as the description proceeds.

In the drawings:

Figure 1 is a side elevation of the truck showing in full line a fabric roll being carried, and in dotted lines the position assumed by the fabric roll when it is being lowered on the floor or placed in the truck.

Fig. 2 is an end elevation.

Fig. 3 is a plan.

The truck consists of a U-shaped frame designated by the numeral 1, the arms of which are supported by two large wheels 2, which are spaced wide enough apart to encompass the fabric roll ordinarily encountered. The end of the frame opposite the wheels 2 is supported on a front axle 3, having small wheels 4 carried on knuckles 5 pivoted to the axle. A tongue 6 is connected with a cross bar 7 which is in turn connected by links 8 to the knuckles 5. By this means the truck may be pulled and steered.

At each side of the frame is secured a vertical U-shaped standard 9 which is of a height sufficient to reach to approximately a midway point of the fabric roll when the same is carried on the truck. On the upper side of each standard 9 is arranged a journal box 10 in which is pivoted a pin 11 extending from the side of a cradle 12. This cradle is of any suitable shape, but is preferably curved in a semi-circle, the center of the cradle being elongated sufficiently to form a firm support for the fabric roll and at the upper and lower ends of the cradle there are secured straps 13 having buckles 14, the straps being designed to surround the roll and hold it firmly against the cradle.

Also mounted on the upper surface of each standard 9 is a bearing 15 in which is rotatably mounted a shaft 16 having at one end a worm gear 17. This worm gear meshes with a worm 18 on a shaft 19 carried in bearings 20 and 21 on one side of the standard. A hand-wheel 22 is secured to the end of the shaft, by which it can be rotated. At a midway point on the shaft 16 there is secured a lever arm 23 to which is pivoted a link 24 connected at its other end to the cradle 12 as at 25.

A heavy metal stirrup or sling 26 is swingingly mounted on the shaft 16 and is provided at its lower end with a strap 27 designed to surround the fabric roll.

The operation of the truck is as follows:

Rolls of fabric are usually stored in an upright position. When it is desired to remove a roll of fabric the workman backs the truck against the roll, the rollers 2 passing on either side as shown in Fig. 3. The truck is pushed against the roll of fabric and the cradle 12 is gradually tilted by the hand wheel 22 until the fabric leans in the position shown in the dotted lines in Fig. 1. While the truck is held stationary a workman takes the ends of the strap 27 which have been previously unfastened, and pulls or swings the stirrup 26 up under the fabric roll. At the same time straps 13 are buckled. The handwheel 22 is then rotated to move the shaft 16 so that the link 24 is pulled down and the cradle 12 moved in an upright position. In this way the fabric is carried in the manner shown in full lines in Fig. 1. When the truck has reached its destination the cradle is tilted until the fabric rests at one side on the floor and the straps 27 and 13 are unbuckled. The stirrup 26 then falls of its own weight into the position shown in dotted lines in Fig. 1. The truck is now withdrawn and the roll of fabric will stand upright on the floor.

Although I have explained my invention in detail it is understood that I am not limited to the specific form shown, but changes may be made without departing from the spirit of the invention or sacrificing any of its benefits.

I claim:

1. In an apparatus of the character described, a truck body, a cradle on the body, means for securing an article to said cradle and means movable beneath the article to support it in said cradle.

2. In an apparatus of the character described, a truck body, a cradle pivotally mounted on the body, means for securing an article to said cradle, means movable beneath the article to support it in said cradle, and means for rocking said cradle.

3. In an apparatus of the character described, a truck body, a cradle on the body, means for securing an article to the cradle, and a swinging stirrup on said body adapted to be moved under the article to support it in said cradle.

4. In an apparatus of the character described, a truck body, a cradle pivotally mounted on the body, means for securing an article to the cradle, a swinging stirrup on said body adapted to be moved under the article to support it in said cradle, and means for rocking said cradle.

5. In an apparatus of the character described, a truck body, a cradle normally in vertical position, a pivotal mounting for said cradle, means for securing an article to said cradle, a swinging stirrup on said body adapted to be moved under the article to support it in said cradle, and means for rocking said cradle about its pivot.

6. In an apparatus of the character described, a truck body, a cradle, a pivotal mounting for said cradle, means for securing an article to said cradle, a swinging stirrup on said body normally hanging to one side of said cradle and adapted to be moved under the article to support it in said cradle, and means for rocking said cradle about its pivot.

WILLIAM C. STEVENS.